(12) United States Patent
Pohjamo

(10) Patent No.: US 6,325,570 B1
(45) Date of Patent: Dec. 4, 2001

(54) FISHWAY SYSTEM WITH TURBINE

(75) Inventor: Timo Pohjamo, Haukipudas (FI)

(73) Assignee: Ecoriver Oy, Haukipudas (FI)

( * ) Notice: Subject to any disclaimer, the term of this patent is extended or adjusted under 35 U.S.C. 154(b) by 0 days.

(21) Appl. No.: 09/446,154

(22) PCT Filed: Jun. 12, 1998

(86) PCT No.: PCT/FI98/00506

§ 371 Date: Dec. 17, 1999

§ 102(e) Date: Dec. 17, 1999

(87) PCT Pub. No.: WO98/58130

PCT Pub. Date: Dec. 23, 1998

(30) Foreign Application Priority Data

Jun. 17, 1997 (FI) .............................................. 972566

(51) Int. Cl.⁷ .............................................. E02B 8/08
(52) U.S. Cl. .............................. 405/81; 405/80; 405/83; 119/219
(58) Field of Search ................... 405/80, 81, 82, 405/83; 119/219

(56) References Cited

U.S. PATENT DOCUMENTS

| 3,038,760 | * | 6/1962 | Crooke | 405/83 X |
| 3,232,060 | * | 2/1966 | Windle | 405/83 |
| 3,293,862 | * | 12/1966 | Harding | 405/81 |
| 3,772,891 | * | 11/1973 | Raistakka | 405/83 |
| 4,437,431 | * | 3/1984 | Kock | 405/81 X |
| 5,673,449 | * | 10/1997 | Henriksson et al. | 405/81 X |
| 6,155,746 | * | 12/2000 | Peters | 405/81 |

FOREIGN PATENT DOCUMENTS

| 55071 |   | 5/1979 | (FI) . |
| 4149306-A | * | 5/1992 | (JP) . |
| 4182504-A | * | 6/1992 | (JP) . |
| 427 941 |   | 5/1983 | (SE) . |
| 467 216 |   | 6/1992 | (SE) . |

* cited by examiner

Primary Examiner—Thomas B. Will
Assistant Examiner—Jong-Suk Lee
(74) Attorney, Agent, or Firm—Connolly Bove Lodge & Hutz LLP

(57) ABSTRACT

A lock-type fishway comprises a first part having an opening to lower water for discharging water therethrough to lure fishes to the first part and a second part having an opening to upper water. A first pipe between the first and second parts is to be filled with water by closing a gate at the first part for bringing the fishes gathered in the first part to the second part. A second pipe is in parallel to the fishway between the upper water and first part and is provided with a turbine for conducting the luring water therethrough and for recovering energy from the luring water.

6 Claims, 5 Drawing Sheets

FISHWAY SYSTEM WITH TURBINE

FIELD OF THE INVENTION

The invention is related to a fishway system and, especially, to a fishway system which includes a lock-type fishway.

DESCRIPTION OF THE RELATED ART

The main use of the fishways is to enable emigrating fish to pass over the barriers, normally power plant dams, and to rise upstream in a river system. Generally, there are two types of fishways. A fish ladder attempts to mimic a natural fishway. A fish ladder is difficult to be carried out if the height of fall is great. Then, a fish ladder will be a long, complicated, and expensive construction. Moreover, the implementation of a fish ladder is quite complicated for lower heights, too, and careful design is always required. A simpler solution is a lock-type fishway, the most common implementation of which is also known as the Borland fishway. An advantage thereof, in comparison with the ladder-type fishway, is that it is structurally much more simpler and may be implemented within a remarkably smaller space. The lock-type fishway is also more suitable to be applied on higher power plant dams.

In Finland, most of the river systems dammed up and equipped for production of electric power, are still lacking fishways, and the main reason for this are the expenses which the building of the fishways would result in. In addition to the design and building costs of the fishways the energy company also loses a remarkable amount of waterpower, because the water discharge of the fishway is reduced from the electric power production. Accordingly, the operating expenses of the fishways are quite high. If a fishway is built, the aim is often to keep the flow rate of the fishway as low as possible, which makes the operation of the fishway less satisfactory. Obviously, the fishways were much more attractive for the energy companies, if an essential reduction in the loss of the electric power could be provided. An object of the invention is to provide a solution achieving such a reduction.

A starting point in the invention is the lock-type fishway, and therefore a simplified description of such a fishway, the operation of which is similar to the operation of a canal provided with locks, is presented in the following with reference to FIGS. 1 and 2. The fishway, which is located in connection with a dam structure 3, includes a first part 9 from which a connection, opening 12, leads to lower water 2. The opening is provided with a gate 13. A second part 4 is connected to upper water 1 via an opening 6 in a wall 5. The second part 4 is separated from the upper water by a gate 7, by means of which water flow to the fishway may be regulated. A rising pipe 8 connects the first part 9 to the second part 4. The first part 9 is advantageously container-like, closed by walls 10, 11 from every side, and the second part 4 is basin-like, as is shown by the schematic sectional drawings of FIG. 1. In operation, water is discharged via the first part 9 to the lower water 2 for luring fishes from the lower water through the opening 12 to the container-like part 9. Water may be discharged directly from the upper water by suitably adjusting the gate 7 (FIG. 1) or, for example, brought by pumping from the lower water. When a long enough time is spent for luring fishes to the container 9, the opening 12 is closed by the gate 13, as is seen in FIG. 2. At the same time the gate 7 is opened, whereby first the container 9 and then the pipe 8 are filled with water. Fishes, which are accustomed to swim under a small pressure close to the water surface, like to keep themselves close to the water surface and thereby rise via the pipe 8 to the basin 4 from which they are able to pass to the upper water. The operation cycle of this type of fishway may be 1 to 4 hours, for example.

Several problems are encountered also when accomplishing a lock-type fishway. For example, if the height of fall is great, a disadvantageously forcible and turbulent flow is caused in the lower part of the fishway when the water is discharged from the fishway. To overcome this problem, the use of energy absorbing or dispersing diffusor means in the flow openings of the fishway is proposed in SE 467216 B. In FI patent 55071 a solution is presented in which the water of the basin to which the fishes have been lured is forced to be transferred, by pumping or air pressure, to the upper water the fishes being transferred therewith. However, no fishway solution is presented in above documents or elsewhere which would be able to essentially reduce the waterpower loss caused by the outcoming flow of water great enough for luring fishes effectively to the fishway.

SUMMARY OF THE INVENTION

For realizing the above and other objects of the invention, the fishway system of the invention is characterized in what is claimed in claim 1 of the attached claims. Other claims define different embodiments of the invention.

The main advantage of the invention is that the discharge of water needed for luring fishes to the fishway is continuously producing energy, and so the loss of water-power is kept low. Remarkably great discharges of water may be used in the fishway and the performance of the fishway may thereby be improved without raising the operational expenses unacceptably. At the same time the structural simplicity of the lock-type fishway may be maintained. The outcoming openings of the fishway are advantageously vertical and are easily found. The fishes must not search for an opening at a certain depth of water. The fishes find also the rising channel easily, and the risk of remaining under high pressure is small. Especially, if the rising pipe is steep, a lot of light is got to the pressure chamber, which makes the rising of the fishes easier.

BRIEF DESCRIPTION OF THE DRAWINGS

The invention and some embodiments thereof are described in further detail in the following with reference to the accompanying drawings, wherein.

DESCRIPTION OF THE PREFERRED EMBODIMENTS

Figure 1:
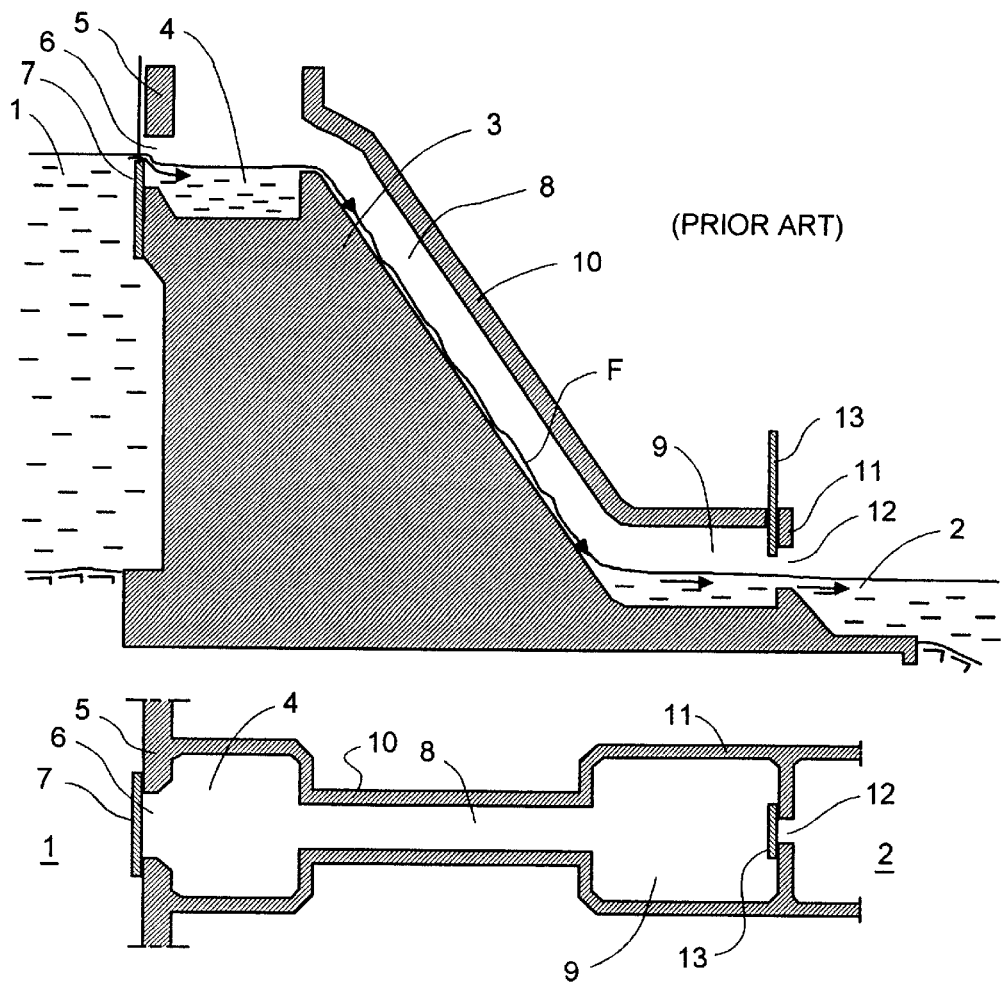
FIGS. 1 and 2 illustrate schematically a prior art lock-type fishway and the operation thereof.
Figure 2:
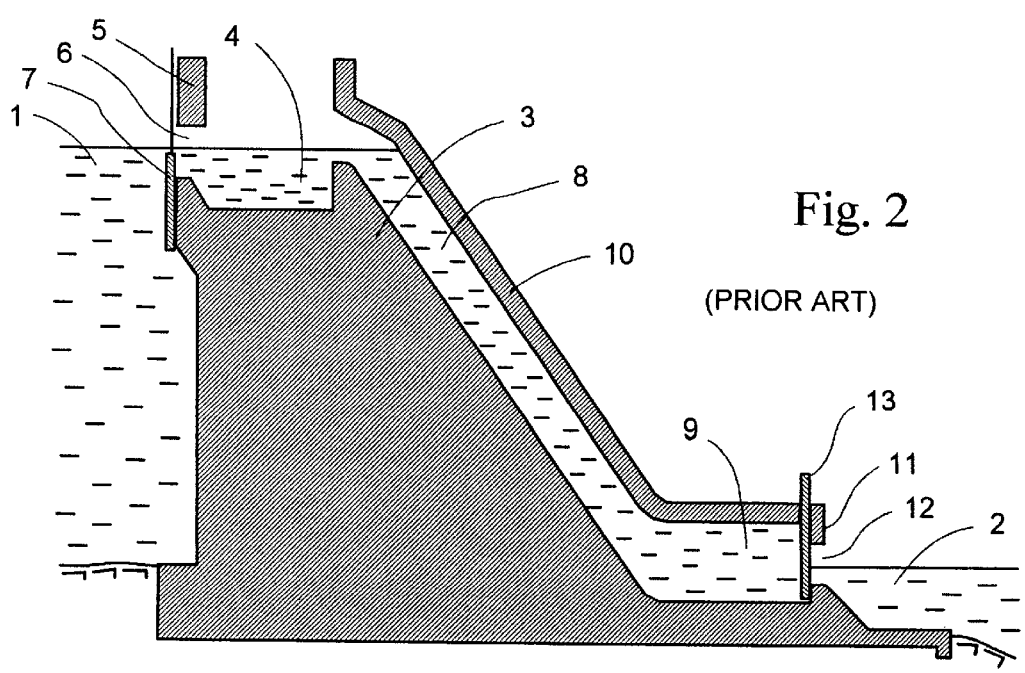
Figure 3:
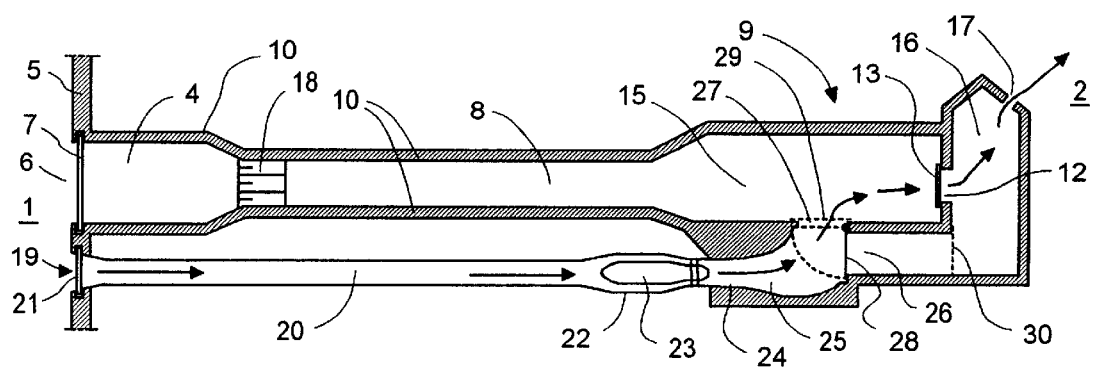
FIG. 3 is a schematic sectional top view through the fishway of an embodiment of the fishway system according to the invention.
Figure 4:
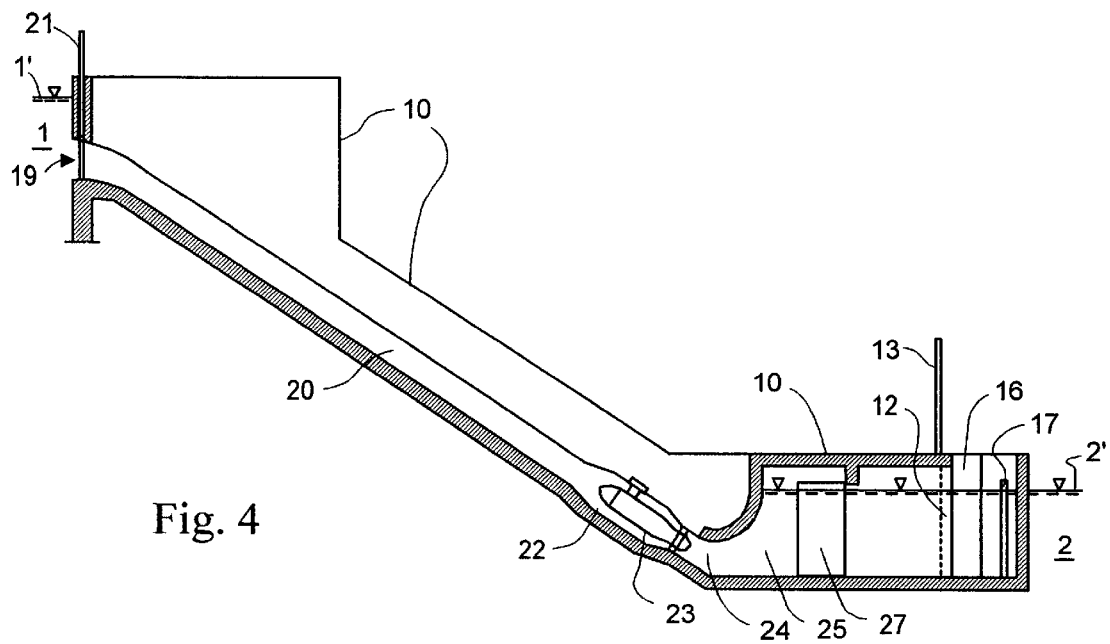
FIG. 4 is a schematic sectional side view through the turbine pipe of the embodiment of FIG. 3.
Figure 5:
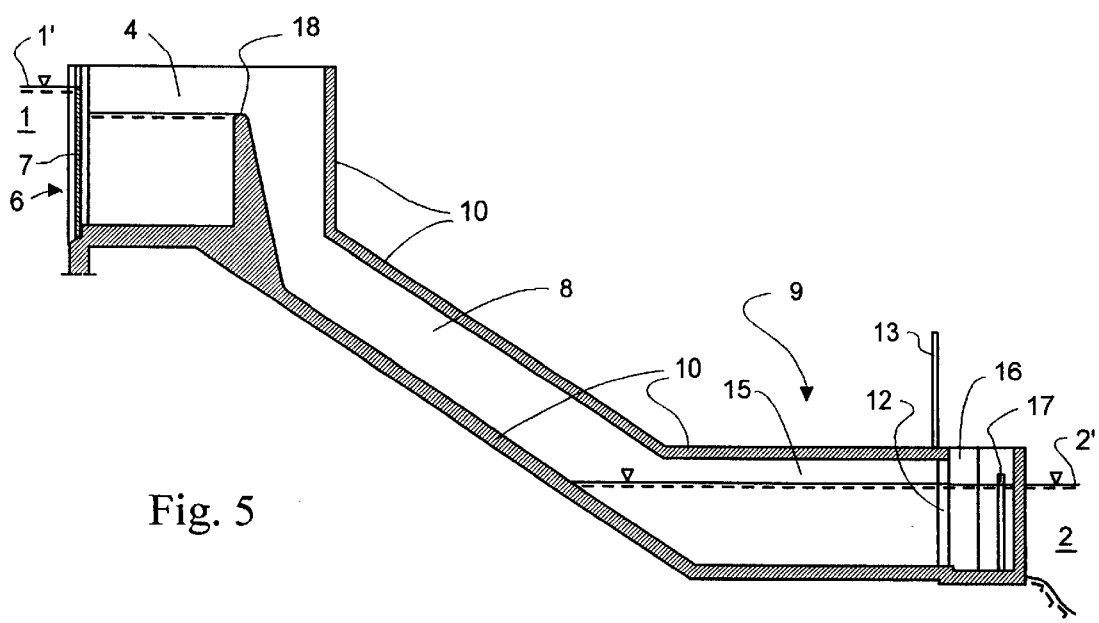
FIG. 5 is a schematic sectional side view through the rising pipe of the embodiment of FIG. 3.

The prior art lock-type fishway was described above in the introductory part of the specification with reference to FIGS. 1 and 2. FIGS. 3 to 5 present a fishway system according to the invention, which includes a lock-type fishway 4, 8, 9 and in a parallel relation thereto a pipe 20 connecting the upper water 1 to the first part 9 of the fishway, the pipe 20 being for providing water flow for luring fishes to the fishway and for recovering energy from the luring water. The structure and operation of the fishway of FIGS. 3 to 5 are described in further detail in the following.

The basin-like part 4 which is connected to the upper water 1 is conventional. In the wall 5 which is against the upper water there are the opening 6 and gate 7, by means of which the discharge of water from the upper water to the fishway may be adjusted. The lock and gate arrangements may include separate arrangements for the rise of fishes on the other hand and for supplying water to the fishway on the other hand. A wall 18 separates the basin 4 from the rising pipe 8 and keeps water in the basin. Walls 10 which are made of concrete, for example, form a closed space including a container or pressure chamber 15, which is in connection with the lower water 2 and to which fishes are brought for rising, and the rising pipe 8, which is open at the upper end only. The opening 12 leads from the container 15 to an open receiver pool 16 from which a relatively narrow opening 17 leads to the lower water 2. The opening 12 is closeable by a gate 13. Also the other pipe 20 is led from the upper water. An opening 19 from the upper water to the pipe 20 is provided with a gate 21, by means of which the flow of water to the pipe may be adjusted or totally closed for maintenance operations, for example. A turbine 23 is located in the pipe 20, and for avoiding cavitation the turbine is preferably located below the lower water surface 2'. The turbine 23 is located in an expansion 22 in the pipe 20, and after the turbine 23 the construction includes a draft tube 24 and space 25 from which there is a connection to the pressure chamber 15 via an opening 27 and to the receiver pool 16 via an opening or space 26. By means of a gate 28 the luring water coming from the turbine pipe 20 is normally conducted via the pressure chamber 15 and the opening 12 to the receiver pool 16 and therefrom via the opening 17 to the lower water, whereby it lures fishes first from the lower water 2 to the receiver pool 16 and then from the receiver pool to the pressure chamber 15 for rising. When the filling of the fishway 15, 8, 4 with water is started the gate 28 is turned to close the opening 27 between the draft tube 24 and space 25 and the pressure chamber 15, and to open the connection from the draft space to the receiver pool 16. Then, the luring water flows via the receiver pool 16 and opening 17 to the lower water and lures fishes to the receiver pool 16 to wait access to the pressure chamber or container 15. A net or equivalent 30 prevents the access of the fishes from the receiver pool 16 to the draft space 25. In the same way a net or equivalent 29 prevents the access of the fishes from the pressure chamber 15 to the draft space 25.

The turbine 23 may be any suitable device which are today easily available. A suitable device is, for example, a tubular turbine which has a propeller turbine and a generator on the same axis. The power may be a suitable power within the range of 20 to 500 kW. This kind of turbines are available as water-tight units which may be installed directly in a water pipe or equivalent. The construction of the turbine is compact, and the necessary accessories need also a small space. There may be only a small building visible above ground for electric station and automatic control equipment. This as such well known technology is not described here in further detail.

The pipe 20 with the turbine 23 and the draft tube 24 and space 25 are also built by applying well known techniques. The discharge and the height of fall are advantageously maintained as approximately constant. The loss of energy is tried to be maintained as small as possible, before conducting the water to the pressure chamber 15. The loss of fall between the pressure chamber 15 and the lower water 2 is also kept as low as possible, whereby the most of the total energy may be transformed to electric power by means of the turbine. A suitable discharge in the turbine pipe depends on the application and is normally within 0.4 to 4 $m^3$/s. A suitable diameter of the pipe is correspondingly in the most cases within 0.5 to 1.5 m.

Figure 6:
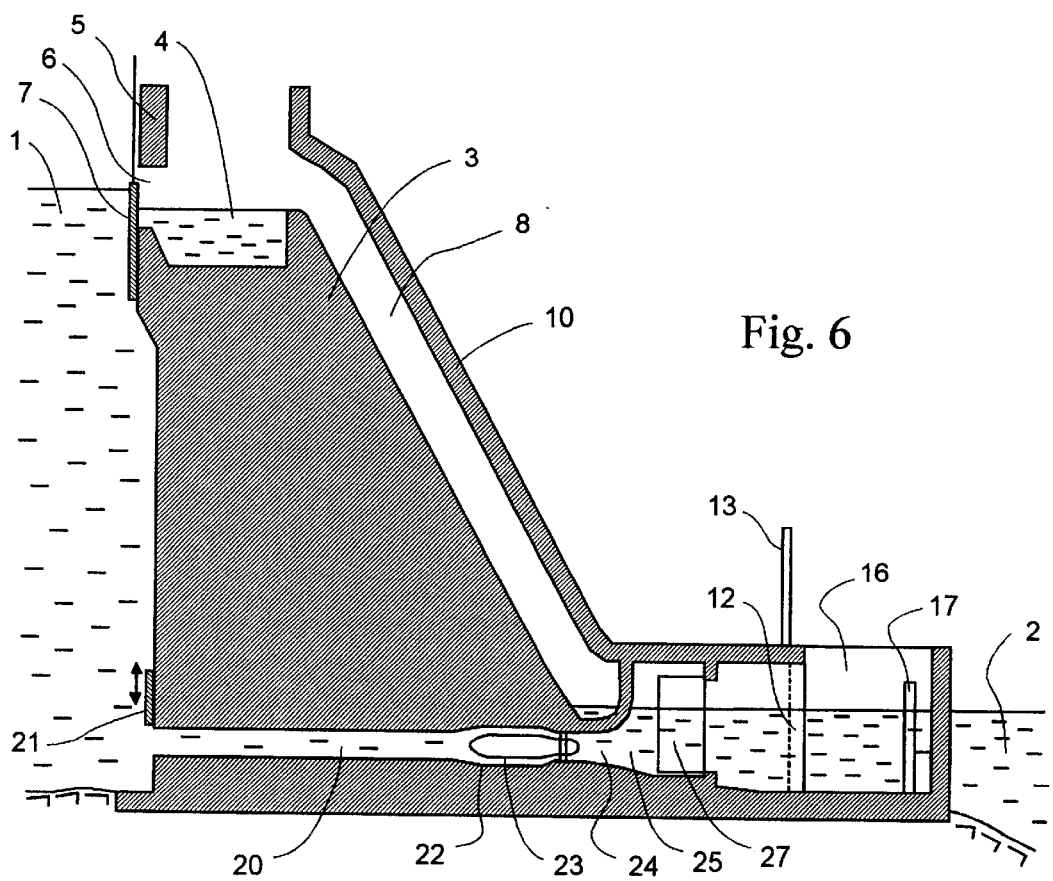
FIG. 6 is a schematic sectional side view of another embodiment of the invention

FIG. 6 presents another embodiment of the fishway system according to the invention. A steep solution, which as such is advantageous in many respects, may be accomplished in a dam structure in such a way that the pipe for a turbine is a horizontal pipe 20 directly through the dam in the lower part thereof, the inlet of which is provided with a suitable gate mechanism 21. Otherwise, this embodiment is similar to the embodiment of FIG. 4, and equivalent or similar parts are indicated by the same reference signs in said FIGS. 4 and 6.

Figure 7:
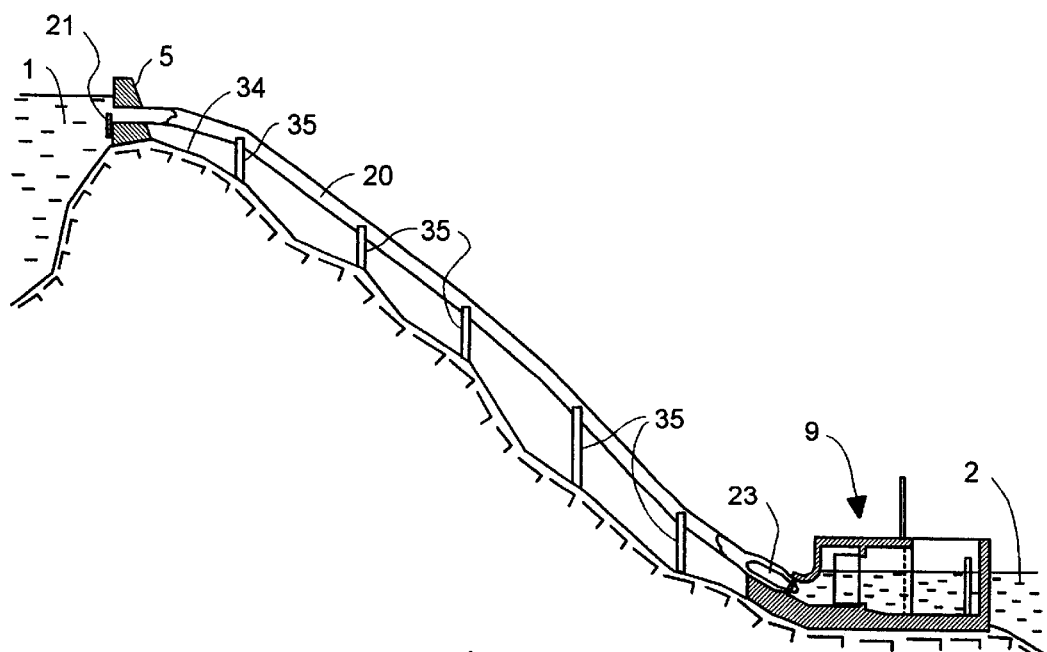
FIG. 7 presents an alternative of carrying out the pipes of the fishway system according to the invention.
Figure 8:
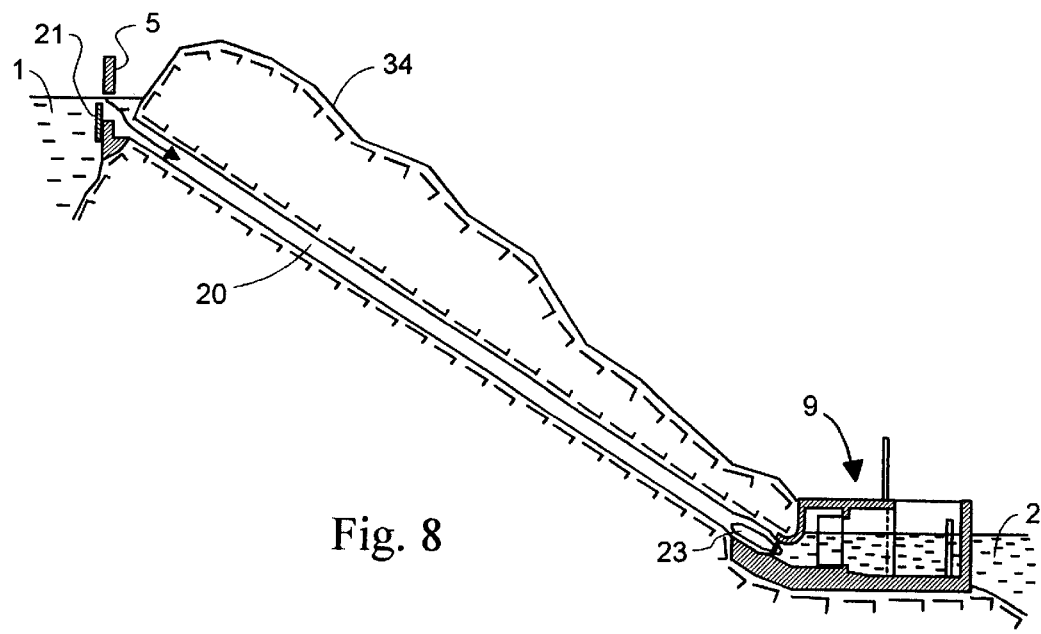
FIG. 8 presents another alternative of carrying out the pipes of the fishway system according to the invention.
Figure 9:
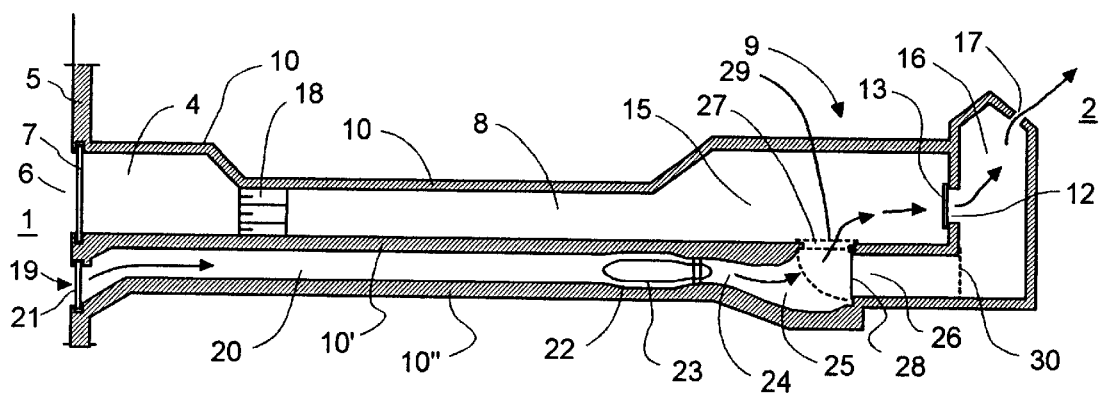
FIG. 9 is a schematic sectional top view presenting a further alternative of carrying out the pipes of the fishway system according to the invention.

In accordance with the application the pipe arrangements may be accomplished in many ways. Some alternatives are presented in the following with reference to FIGS. 7 to 9. In said figures only the turbine pipe is presented as a side view and wholly or partly in section. The rising pipe may be accomplished with the same or some other suitable technique. If the fishway is built over an earth dam 34, for example, a practical and advantageous way of accomplishing the pipes is that shown by the separate pipe 20 of FIG. 7, the pipe being supported by suitable means 35. An alternative in such a situation is to build the pipes inside the earth dam 34 in the way shown by FIG. 8. A further alternative is a concrete structure, in which the rising pipe 8 and the turbine pipe 20 are accomplished by concrete walls 10, 10', and 10'' and in which they may be side by side and separated from each other by only one wall 10'. This alternative is well suited for carrying out steep fishways. Otherwise, this fishway system includes the same parts and structures as the embodiment of FIG. 3.

Figure 10:
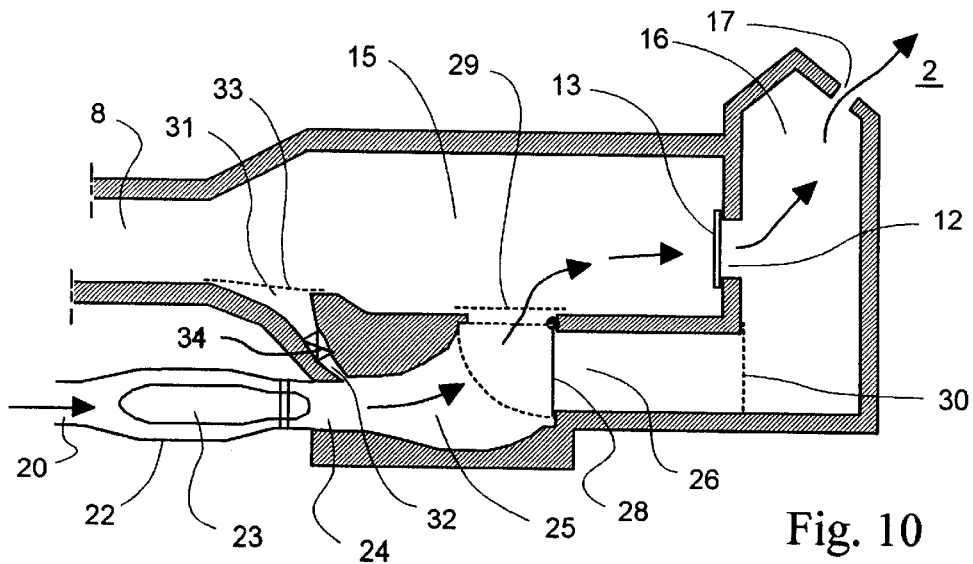
FIG. 10 is a schematic sectional top view presenting a further embodiment of the fishway system according to the invention.
Figure 11:
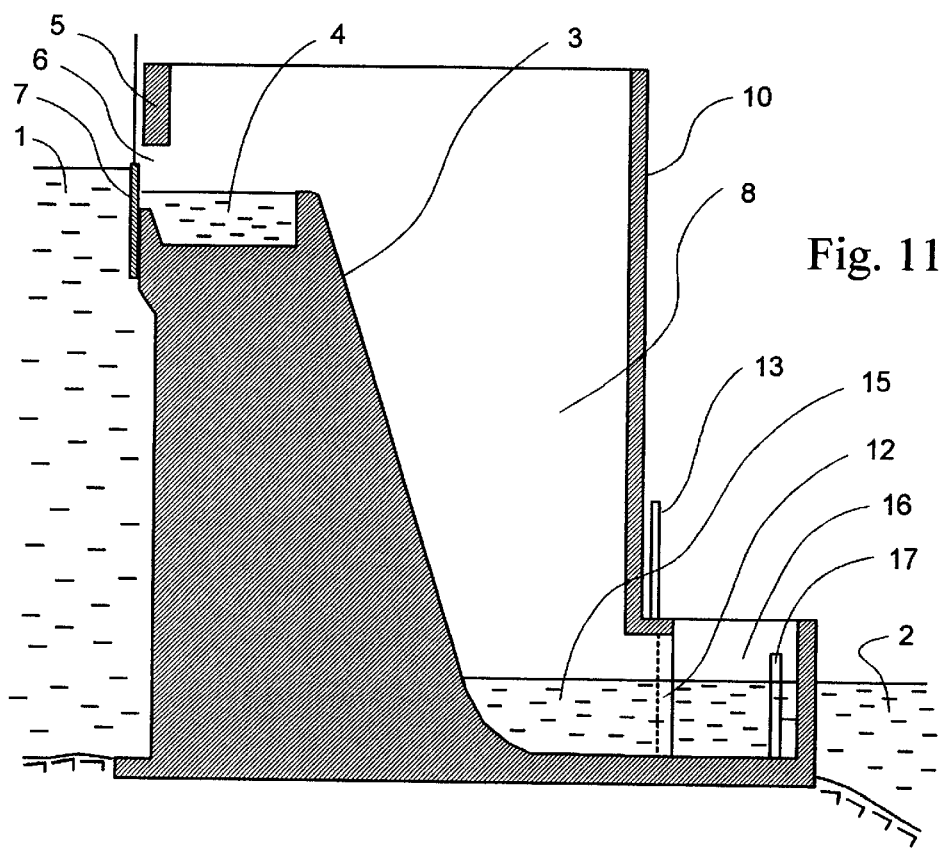
FIG. 11 is a schematic sectional side view through the fishway of a further embodiment of the fishway system according to the invention.
Figure 12:
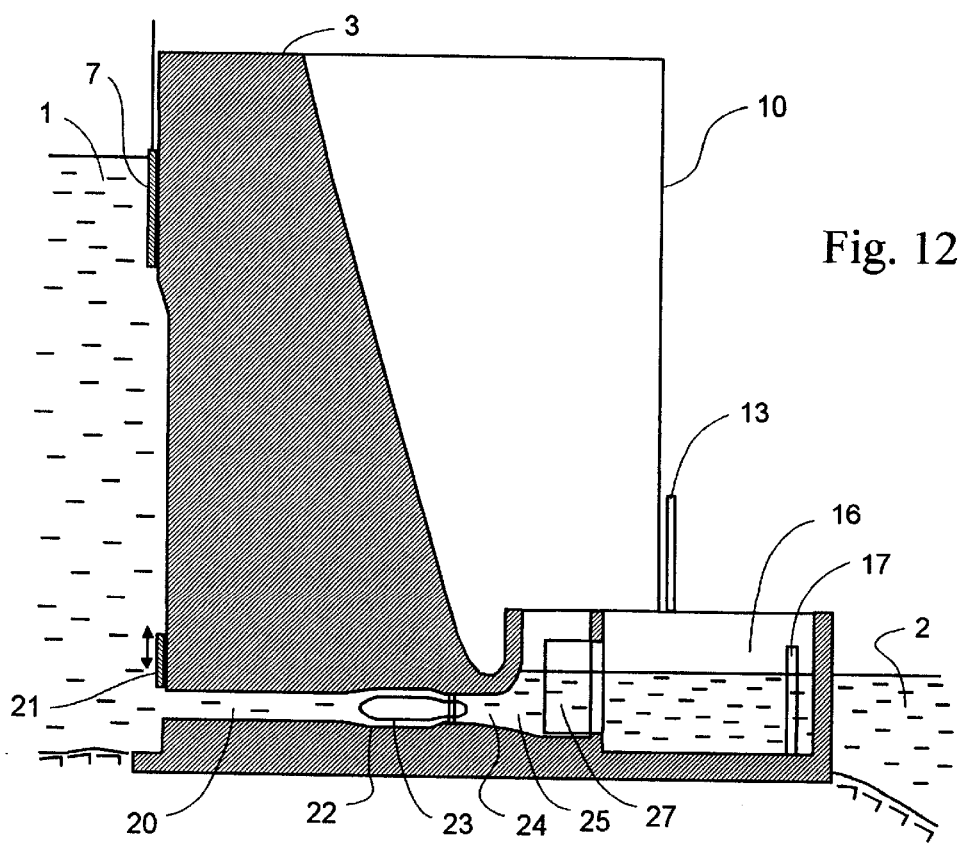
FIG. 12 is a schematic sectional side view through the turbine pipe of the embodiment of FIG. 11.

FIG. 10 presents an embodiment which further improves the operating efficiency of the fishway. There is a pipe 31 between the pressure chamber 15 and the draft tube 24. The pipe is provided with an adjustable valve 34 and nozzle means 32 directed to the draft tube. As the fishway is filled with water, the valve 34 is closed, and during the discharging phase it is suitably opened for conducting water through the nozzle 32 to the draft tube 24, so that ejector effect is accomplished in the draft tube, which increases the efficiency of the turbine. The inlet of the pipe 31 on the side of the pressure chamber is provided with a net or grating 33 for preventing the access of fishes to the pipe.

A good building material for the basin, container, and draft tube is armed concrete. Armed concrete may be used also for accomplishing other parts of the fishway and turbine pipe. Steel, for example, or some suitable plastic, or fiberglass-reinforced plastic, or even wood may be used for making channels. A recommendable and widely used material for making the gates is steel or aluminum.

The term "pipe or equivalent" is used in this specification and in the accompanying claims to mean firstly the structure which connects the lower and upper parts of the fishway, and secondly the structure in which the turbine is located. As to the first structure the term "pipe or equivalent" covers also also a shaft-like structure open at the upper end which may be used in a steep fishway, for example. As to the second structure a generally pipe-like structure is meant through which the luring water may be conducted and in which the turbine may be located.

A person skilled in the art understands that the parts of the fishway and especially the the lower part of the fishway, which is in connection with the lower water and which is essential in the present invention, may be accomplished in many different modes. The location and size of the receiver pool and pressure chamber may vary widely. The openings and gates are presented only schematically here above, and there are a lot of forms and structures by means of which they may be accomplished. It is clear that the gates, valves, etc. need driving and actuating means, and that control means are needed for controlling the whole operation of the fishway. Well known techniques are applied to accomplish these means. It may be thought, for example, that for the fishway and the turbine there is a common operating and control center, which may be located in a separate small building or in a power plant building.

It is clear, also, that any amendments in the operation of the fishway may be utilized in carrying out the fishway of the fishway system according to the invention.

The invention may vary within the scope of the appended claims.

What is claimed is:

1. A fishway system including a lock-type fishway (4,8,9), which includes:
    a first part (9) from which there is a connection (12) to lower water (2) for discharging water therethrough to the lower water and thereby lure fishes to said first part;
    a second part (4) from which there is a connection (6) to upper water (1);
    a first pipe (8) between the first part (9) and the second part (4); and
    means (13, 7) for closing periodically the connection (12) from the first part (9) to the lower water (2) and to fill the first pipe (8) with water for bringing the fishes gathered in the first part (9) from the first part to the second part (4) and from there onwards to the upper water (1); and
    in parallel relationship to the fishway (4, 8, 9) between the upper water (1) and the first part (9) of the fishway, a second pipe (20, 24, 25) and therein a turbine (23) for conducting the luring water therethrough and for recovering energy from the luring water.

2. The fishway system according to claim 1, comprising:
    within the first part of the fishway, a receiver pool (16) which is connected to the lower water (2), and a pressure chamber (15) which is connected directly to the first pipe (8) and via a closeable opening (12) to the receiver pool (16); and
    means (26, 27, 28) for conducting the water from the second pipe (20, 24, 25) either directly to the receiver pool (16) and therethrough to the lower water (2) or to the pressure chamber (15) and therefrom onwards to the receiver pool (16) and the lower water (2).

3. The fishway system according to claim 2, wherein a draft tube (24, 25) is located next to the turbine (23) and the means (26, 27, 28) for conducting water are located in close proximity to the draft tube (24, 25).

4. The fishway system according to claim 2 wherein a draft tube (24, 25) is located next to the turbine (23), further comprising, between the pressure chamber (15) and the draft tube (24, 25), a pipe (31) with nozzle means (32) directed to the draft tube (24, 25) for conducting water during the discharging phase, which follows the filling of the first pipe (8), from the fishway to the draft tube (24, 25) to accomplish ejector effect therein.

5. The fishway system according to claim 4, wherein said pipe (31) with nozzle means (32) includes an adjustable valve (34).

6. The fishway system according to claim 1, wherein the turbine (23) is below the surface (2') of the lower water.

* * * * *